United States Patent [19]

Ikeno et al.

[11] Patent Number: 4,990,560

[45] Date of Patent: Feb. 5, 1991

[54] CURABLE ORGANOPOLYSILOXANE COMPOSITION

[75] Inventors: Masayuki Ikeno, Annaka; Hironao Fujiki, Takasaki, both of Japan

[73] Assignee: Shin-Etsu Chemical Co., Ltd., Tokyo, Japan

[21] Appl. No.: 394,589

[22] Filed: Aug. 16, 1989

[30] Foreign Application Priority Data

Sep. 7, 1988 [JP] Japan .................. 63-224326

[51] Int. Cl.$^5$ ................................ C08K 5/24
[52] U.S. Cl. .................. 524/731; 524/267; 525/478; 528/15; 528/31; 528/32
[58] Field of Search ............ 528/32, 15, 31; 525/478; 524/267, 731

[56] References Cited

U.S. PATENT DOCUMENTS 4,870,149 9/1989 Hara et al. .................. 525/478

Primary Examiner—Melvyn I. Marquis
Attorney, Agent, or Firm—Wyatt, Gerber, Burke and Badie

[57] ABSTRACT

A curable organopolysiloxane composition comprising a vinyl-containing organopolysiloxane, organohydrogenpolysiloxane and platinum catalyst is proposed which is cured into a gel-like material suitable as a potting and encapsulating agent for protecting, for example, electronic components from mechanical shocks and adverse influence of the ambient atmosphere. Different from conventional similar compositions, the gelled material from the inventive composition little suffers from the problem of bleeding of oily materials contained therein on the surface. This unique advantage is obtained by using, in place of the conventional vinyl-containing organopolysiloxanes in which the vinyl groups are bonded to the silicon atoms at random position in the molecular chain, a combination of two vinyl-containing organopolysiloxanes having a specified viscosity in a limited proportion, of which one has two and only two vinyl groups in a molecular each bonded to one of the silicon atoms at the molecular chain ends and the other has one and only one vinyl group in a molecule bonded to one of the silicon atoms at the molecular chain ends alone. The composition may further contain a low-viscosity dimethylpolysiloxane so that the silicone gel can be imparted with softness and adhesiveness without increasing the amount of bleeding of the oily constituents.

8 Claims, No Drawings

CURABLE ORGANOPOLYSILOXANE COMPOSITION

BACKGROUND OF THE INVENTION

The present invention relates to a curable organopolysiloxane composition or, more particularly, to an organopolysiloxane composition curable into a gelled mass suitable as a potting and encapsulating agent, for example, for protecting various electric and electronic components from mechanical shocks and influences of the ambient atmosphere without the problem of oozing or bleeding of the oily constituents contained therein.

Organopolysiloxane compositions cured to have a gel-like consistency, referred to as a silicone gel hereinafter, are widely used as a potting and encapsulating agent of various kinds of electric and electronic devices and components by virtue of their excellent electric properties such as insulation with stability and mechanical properties such as shockabsorbing power. For example, components of electronic circuits such as power transistors, integrated circuits, capacitors and the like are embedded in a silicon gel so as to be protected from mechanical shocks and thermal and corrosive influences of the outer atmosphere which would otherwise cause a damage on the component.

Organopolysiloxane compositions capable of giving a silicone gel are cured by a crosslinking reaction which proceeds by several different mechanisms. Most of the organo-polysiloxane compositions to give a silicone gel utilize the so-called addition reaction or hydrosilation reaction between vinyl groups directly bonded to the silicon atoms in a first organopolysiloxane and hydrogen atoms directly bonded to the silicon atoms in a second organopolysiloxane or organo-hydrogenpolysiloxane in the presence of a platinum catalyst. Various formulations have been proposed in the prior art for the addition-curable organopolysiloxane-based silicone gel compositions with an object to obtain an adequately controlled gel-like consistency. For example, Japanese Patent Kokai 56-143241, 62-39659, 63-35655 and 63-33475 disclose a composition comprising a vinyl-containing organopolysiloxane and an organohydrogenpolysiloxane in such a proportion as to provide a relatively small amount or from 0.3 to 0.6 moles of the silicon-bonded hydrogen atoms in the organohydrogenpolysiloxane per mole of the vinyl groups n the vinyl-containing organopolysiloxane or a composition formulated with a vinyl-containing organopolysiloxane containing from 0.1 to 1.8 moles of the silicon-bonded vinyl groups per mole on an average.

These prior art organopolysiloxane compositions, however, have a problem in common that the oily constituents contained in the silicone gel obtained therefrom more or less subsequently bleed out of the surface or migrate toward a body embedded therein or in contact therewith. In the composition of the former type containing the silicon-bonded vinyl groups in an amount smaller than equimolar to the silicon-bonded hydrogen atoms, namely, the silicone gel obtained therefrom necessarily contains a considerable amount of the uncrosslinked organopolysiloxane which is responsible for the undesirable phenomenon of bleeding. In the composition of the latter type utilizing a vinyl-containing organopolysiloxane containing a relatively small amount of the silicon-bonded vinyl groups on an average, the organopolysiloxane as a product of the equilibration reaction is a mixture containing molecular species of the organopolysiloxane having no silicon-bonded vinyl groups and hence incapable of pertaining to the crosslinking reaction so that the silicone gel obtained from the composition always contains such as unreactive constituent responsible for bleeding. Once the phenomenon of bleeding has taken place, the bleeding oily matter badly contaminates the electric or electronic component in contact with the silicon gel to cause troubles of failure in the electric connection between contacting terminals and the like. When such a silicone gel is in contact with a part made from a silicon rubber, in addition, the oily matter bleeding out of the silicon gel acts as a swelling agent of the silicone rubber to cause volume expansion or deformation of the silicon rubber parts.

SUMMARY OF THE INVENTION

The present invention accordingly has an object to provide an organopolysiloxane composition which is curable by crosslinking by the mechanism of the addition reaction to give a silicone gel free from the problem of bleeding of the oily matter contained therein.

Thus, the curable organopolysiloxane composition of the present invention comprises, as a uniform blend:

(A) a vinyl-containing organopolysiloxane which is a combination of (A-1) from 1% to 99% by weight or, preferably, from 20% to 80% by weight of a first vinyl-containing diorganopolysiloxane having a viscosity in the range from 300 to 100,000 centipoise at 25° C. and represented by the general formula

$$\text{Vi}-\text{SiR}_2-\text{O}-(\text{SiR}_2-\text{O}_p)-\text{SiR}_2-\text{Vi}, \qquad (I)$$

in which Vi is a vinyl group, R is a substituted or unsubstituted monovalent hydrocarbon group free from aliphatic unsaturation having 1 to 10 carbon atoms and the subscript p is a positive integer, and (A-2) from 99% to 1% by weight or, preferably, from 80% to 20% by weight of a second vinyl-containing diorganopolysiloxane having a viscosity in the range from 300 to 100,000 centipoise at 25° C. and represented by the general formula

$$\text{Vi}-\text{SiR}_2-\text{O}-(\text{SiR}_2-\text{O})_p-\text{SiR}_2-\text{Me}, \qquad (II)$$

in which Vi and R each have the same meaning as defined above, Me is a methyl group and the subscript q is a positive integer;

(B) an organohydrogenpolysiloxane represented by the average unit formula

$$R_a H_b SiO_{(4-a-b)/2}, \qquad (III)$$

in which R has the same meaning as defined above, the subscript a is a positive number not exceeding 3 and the subscript b is a positive number not exceeding 2 with the proviso that a+b is smaller than 4, and having at least three hydrogen atoms directly bonded to the silicon atoms in a molecule in an amount sufficient to provide form 0.8 to 2.0 moles of the hydrogen atoms directly bonded to the silicon atoms per mole of the vinyl groups in the component (A); and (C) a catalytic amount of a compound of a metal selected from the group consisting of platinum, palladium and rhodium.

The above defined organopolysiloxane composition optionally, further comprises:

(D) a vinyl-free organopolysiloxane having a viscosity not exceeding 200 centipoise at 25° C. and represented by the general formula

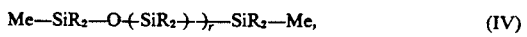

$$\text{Me—SiR}_2\text{—O} \;\text{\textlparen}\text{SiR}_2\text{\textrparen}_r\text{—SiR}_2\text{—Me,} \quad \text{(IV)}$$

in which Me and R each have the same meaning as defined above and the subscript r is a positive integer, in an amount in the range from 5 to 200 parts by weight per 100 parts by weight of the component (A).

DETAILED DESCRIPTION OF THE PREFERRED EMBODIMENTS

As is described above, the essential constituents in the inventive organopolysiloxane composition are the components (A), (B) and (C), of which the component (A) is the most characteristic and is a combination of vinyl-containing organopolysiloxanes of two different types in a specified proportion. Specifically, the vinyl groups in these vinyl-containing organopolysiloxanes are bonded each only to one of the silicon atoms at the molecular chain terminals as in indicated by the general formulas (I) and (II). This is in great contrast to the conventional formulations of similar organopolysiloxane compositions in which the vinyl groups in the vinyl-containing organopolysiloxane are bonded to the silicon atoms at random positions in the molecular chain. Moreover, the component (A) is a combination of two different vinyl-containing organopolysiloxanes of which one has the vinyl groups bonded to both of the terminal silicon atoms while the other has the vinyl groups bonded only to either one of the terminal silicon atoms, the silicon atom at the other molecular chain end being bonded to a methyl group. As a consequence of this unique formulation, the organopoly-siloxane composition of the invention is capable of giving a silicone gel which suffers litter from the disadvantageous phenomenon of bleeding of the oily constituent contained therein with a greatly decreased amount of unreacted or unreactive organopolysiloxane constituents not pertaining to the crosslinked structure of the silicone gel.

Moreover, the silicone gel obtained from the inventive organopolysiloxane composition is imparted with increased softness and adhesiveness when the composition is compounded with the vinyl-free organopolysiloxane as the component (D) without increasing the phenomenon of bleeding of the oily constituents. Such as unexpected advantage is obtained only when the vinyl-free organopolysiloxane as the component (D) has a viscosity substantially lower than that of the vinyl-containing organopolysiloxane (A-1) or (A-2) in contrast to the prior art in which the vinyl-free organopolysiloxane, when added, has a viscosity equivalent to or higher than that of the vinyl-containing organopolysiloxane.

One of the vinyl-containing organopolysiloxanes forming the component (A), i.e. component (A-1), is a diorganopolysiloxane having two vinyl groups bonded to the silicon atoms at the molecular chain ends in a molecule and represented by the general formula

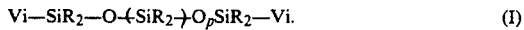

$$\text{Vi—SiR}_2\text{—O}\;\text{\textlparen}\text{SiR}_2\text{\textrparen}_p\text{O}\text{SiR}_2\text{—Vi.} \quad \text{(I)}$$

In the formula (I), Vi is a vinyl group and R is a substituted or unsubstituted monovalent hydrocarbon group having 1 to 10 carbon atoms and free from aliphatic unsaturation exemplified by alkyl groups, e.g., methyl, ethyl, n-propyl, isopropyl, butyl and octyl groups, cycloalkyl groups, e.g., cyclopentyl, cyclohexyl and cycloheptyl groups, aryl groups, e.g., phenyl, naphthyl, tolyl and xylyl groups, and aralkyl groups, e.g., benzyl, 2-phenylethyl and 3-phenylpropyl groups, as well as halogen- or cyano-substituted hydrocarbon groups, e.g., chloromethyl, trifluoromethyl, 3,3,3-trifluoropropyl, chlorophenyl, dibromophenyl, tetrachlorophenyl, 3-cyanopropyl and 2-cyanopropyl groups. Preferably, the group denoted by R is a methyl group.

The subscript p in the formula (I) is a positive integer of such a value that the vinyl-containing organopolysiloxane of the formula (I) may have a viscosity in the range from 300 to 100,000 centipoise or, preferably, from 500 to 10,000 centipoise at 25° C. When the component (A-1) has a viscosity outside the above mentioned range, the organopolysiloxane composition before curing prepared from such a vinyl-containing organopolysiloxane would not have an adequate flowability suitable as a potting or encapsulating agent and the silicone gel obtained from the composition would not have a consistency to be effective as a potting or encapsulating material.

The second vinyl-containing organopolysiloxane as the other constituent of the component (A) is a diorganopolysiloxane having only one vinyl group in a molecule bonded to one of the terminal silicon atoms at the molecular chain ends and represented by the general formula

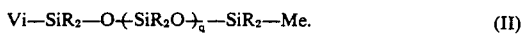

$$\text{Vi—SiR}_2\text{—O}\;\text{\textlparen}\text{SiR}_2\text{O}\text{\textrparen}_q\text{—SiR}_2\text{—Me.} \quad \text{(II)}$$

In the formula (II), Me is a methyl group and Vi and R each have the same meaning as defined above. This component is important in order to obtain a silicone gel having only little number of unreacted vinyl groups and still having an adequate consistency as a potting or encapsulating material.

The subscript q in the formula (II) is a positive integer of such a value that the vinyl-containing organopolysiloxane of the formula (II) may have a viscosity in the range from 300 to 100,000 centipoise or, preferably, from 500 to 10,000 centipoise at 25° C. When the component (A-2) has a viscosity outside the above mentioned range, the organopolysiloxane composition before curing prepared from such a vinyl-containing organopolysiloxane would not have an adequate flowability suitable as a potting or encapsulating agent and the silicone gel obtained from the composition would not have a consistency to be effective as a potting or encapsulating material.

Although no detailed description is given here, each of the vinyl-containing organopolysiloxanes (A-1) and (A-2) is a known material of which the synthetic method is well known in the art of silicones. For example, the organopolysiloxane of the formula (II) can be prepared according to the method reported, for example, by C. L. Lee, et al. in Polymer Preprint, volume 1969, No. 10, pages 1361.

The proportion of the amounts of the vinyl-containing organopolysiloxanes (A-1) and (A-2) in the inventive composition is a factor influencing the consistency of the silicone gel obtained by curing the composition. When the inventive organopolysiloxane composition is intended to be used as a potting or encapsulating agent, it is usual that the component (A) is composed of from 1% to 99% or, preferably, from 20% to 80% by weight of the component (A-1) and from 99% to 1% or, preferably, from 80% to 20% by weight of the component (A-2).

The component (B) in the inventive organopolysiloxane composition is an organohydrogenpolysiloxane represented by the average unit formula $$R_a H_b SiO_{(4-a-b)/2} \quad (III)$$

in which R has the same meaning as defined above for the formulas (I) and (II) or, preferably, is a methyl group, the subscript a is a positive number not exceeding 3 and the subscript b is a positive number not exceeding 2 with the proviso that a+b is smaller than 4. It is essential that the organohydrogenpolysiloxane as the component (B) has at least three hydrogen atoms directly bonded to the silicon atoms in a molecule in order that the component serves as a crosslinking agent of the vinyl-containing organopolysiloxanes by the hydrosilation reaction to give a silicon gel. The silicon-bonded hydrogen atoms can be bonded to the silicon atoms at any positions in the molecular structure including the silicon atoms at the molecular chain ends as well as at the intermediate positions in the molecular chain. The organohydrogenpolysiloxane as the component (B) is compounded with the component (A) in an amount sufficient to provide from 0.8 to 2.0 moles or, preferably, from 1.0 to 1.5 moles of the hydrogen atoms directly bonded to the silicon atoms per mole of the vinyl groups in the component (A). When the amount of the component (B) is too small, the crosslinking reaction cannot proceed to a full extent to leave a considerable amount of the vinyl groups unreacted so that the resultant silicone gel may have a decreased heat resistance. When the amount of the component (B) is too large, on the other hand, a considerable amount of the silicon-bonded hydrogen atoms are left as unreacted even after completion of the hydrosilation reaction of the silicon-bonded vinyl groups so that the resultant silicone gel may have a decreased heat resistance in addition to the problem that foaming of the silicon gel may sometimes take place. Though not particularly limitative, the organohydrogenpolysiloxane as the component (B) has a viscosity not exceeding 1000 centipoise at 25° C. in order to avoid an increase in the manufacturing cost of the organohydrogenpolysiloxane.

The component (C) in the inventive composition is a catalyst for promoting the addition reaction or the hydrosilation reaction between the silicon-bonded vinyl groups in the component (A) and silicon-bonded hydrogen atoms in the component (B). Such a catalytic compound is well known in the art of silicones including compounds of a metal selected from the group consisting of platinum, palladium and rhodium, of which platinum compounds are preferred. Examples of the catalytic compounds or catalytic preparations include chloroplatinic acid, alcohol-modified chloroplatinic acid in the form of an alcohol solution, coordination compounds of chloroplatinic acid with an olefin or a vinyl siloxane, tetrakis(triphenyl phosphine) palladium, chloro tri(triphenyl phosphine) rhodium and the like. The amount of the component (C) added to the inventive composition is a so-called catalytic amount and naturally depends on the desired velocity of the crosslinking reaction. It is usual that the amount thereof, calculated as the metal, e.g., platinum, is in the range from 0.1 to 100 ppm by weight based on the total amount of the components (A) and (B).

Though as an optional component, the inventive organopolysiloxane composition can further contain a vinyl-free dioranopolysiloxane as the component (D) having a silicon-bonded methyl group at each molecular chain end and represented by the general formula $$Me-SiR_2-O+SiR_2+_rO_rSiR_2-Me, \quad (IV)$$

in which Me is a methyl group, R has the same meaning as defined before for the formulas (I) to (III) and the subscript r is a positive integer, with an object to modify the softness and stickiness of the silicone gel obtained by curing the inventive composition. The amount of the component (D) in the inventive composition, when added, is in the range from 5 to 200 parts by weight per 100 parts by weight of the component (A). The amount thereof should be large when the silicon gel obtained from the composition is desired to have high softness and stickiness. When the amount of the component (D) is too small, no substantial improvements can be obtained in this regard by the addition thereof as a matter of course. When the amount of the component (D) is too large, on the other hand, the resultant silicone gel would be too soft and the problem of bleeding may be caused.

It is essential that the vinyl-free organopolysiloxane as the component (D) has a viscosity substantially lower than that of either of the vinyl-containing organopolysiloxanes (A-1) and (A-2). Preferably, the vinyl-free organopolysiloxane as the component (D) should have a viscosity not exceeding 200 centipoise at 25° C. When the viscosity of the vinyl-free organopolysiloxane as the component (D) is too high, the component (D) may behave as a constituent responsible for bleeding out of the cured silicone gel.

In addition to the above described components (A), i.e., (A-1) and (A-2), (B), (C) and, optionally, (D), which, by merely uniformly blending, give the curable organopolysiloxane composition of the invention, it is optional that various kinds of known additives are admixed with the composition each in a limited amount not to effect the intrinsically excellent properties of the silicone gel. For example, a low molecular organopolysiloxane having only one unit with a silicon-bonded hydrogen atoms, e.g., $HSiMe_2O_{0.5}$ and HSiMeO, can be added in combination with the organohydrogenpolysiloxane as the component (B). Other optional known additives added according to need include reinforcing and non-reinforcing inorganic fillers to improve or modify the rheological, mechanical and electrical properties of the silicone gel depending on the intended application thereof such as fumed silica fillers, precipitated silica fillers, finely pulverized quartz powders, diatomaceous earth, iron oxide, zinc oxide, titanium dioxide, alumina, aluminum nitride, boron nitride, silver powder, carbon black, graphite powder, powder of glassy carbon and the like, reaction moderators, coloring agents, antioxidants and so on.

The organopolysiloxane composition of the invention can be cured into a silicone gel by heating, for example, at a temperature in the range from 70° to 150° C. for a length of time in the range from 30 minutes to 2 hours. The thus obtained silicone gel has excellent stability, electric properties and low moisture absorption and suffers little from the problem of bleeding of oily constituents contained therein so that the composition, when it is insulating, is useful as a potting and encapsulating material of various kinds of electronic components such as power transistors, integrated circuits, capacitors and the like.

In the following, the organopolysiloxane composition of the invention is described in more detail by way of examples and comparative examples, in which the term of "parts" always refers to "parts by weight" and the values of viscosity are all those obtained by the measurement at 25° C. The symbols Vi and Me each denote a vinyl group and a methyl group, respectively.

EXAMPLE 1

A curable organopolysiloxane composition for silicone gel was prepared by uniformly blending 20 parts of a first vinyl-containing organopolysiloxane having a viscosity of 1000 centipoise and expressed by the structural formula

Vi-SiMe$_2$—O—(SiMe$_2$—O)$_{240}$SiMe$_2$—Vi, 80 parts of a second vinyl-containing organopolysiloxane having a viscosity of 800 centipoise and expressed by the structural formula

Vi—SiMe$_2$—O—(SiMe$_2$—O)$_{200}$SiMe$_2$—Me, 1.45 parts of an organohydrogenpolysiloxane having a viscosity of 13 centipoise and expressed by the structural formula

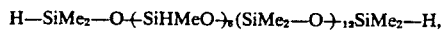
H—SiMe$_2$—O—(SiHMeO)$_n$(SiMe$_2$—O)$_{12}$SiMe$_2$—H, and 0.025 part of a solution of chloroplatinic acid in 2-ethylhexyl alcohol containing 2% by weight of platinum. The molar ratio of the silicon-bonded hydrogen atoms in the organohydrogenpolysiloxane to the silicon-bonded vinyl groups in the vinyl-containing organopolysiloxanes was 1.1.

When heated at 150° C. for 1 hour, the thus prepared composition was converted into a clear gel-like material which was subjected to the penetration test according to the procedure specified in JIS K 2808 by using a ¼-inch microconsistency tester to give a value of 70. Further, a 5 g portion of the gelled composition was subjected to an extraction test in a Soxhlet extractor for 4 hours using n-hexane as the solvent to find that the weight loss by extraction was 1% by weight.

EXAMPLE 2

The experimental procedure was substantially the same as in Example 1 except that the amount of the first vinyl-containing organopolysiloxane was increased to 30 parts, the amount of the second vinyl-containing organopolysiloxane was decreased to 70 parts and the amount of the organohydrogen-polysiloxane was decreased to 1.12 parts. The molar ratio of the silicon-bonded hydrogen atoms in the organohydrogenpolysiloxane to the silicon-bonded vinyl groups in the vinyl-containing organopolysiloxanes was 0.8.

The value obtained in the penetration test was 75 and the weight decrease in the extraction test was 2% by weight.

Comparative Example 1

The experimental procedure was substantially the same as in Example 2 except that the second vinyl-containing organopolysiloxane was omitted and the amount of the first vinyl-containing organopolysiloxane was increased to 100 parts. The molar ratio of the silicon-bonded hydrogen atoms in the organohydrogenpolysiloxane to the silicon-bonded vinyl groups in the vinyl-containing organopolysiloxanes was 0.5. The penetration test of the cured silicone gel obtained from the composition gave a value of 30 and the weight decrease in the extraction test was 40%.

Comparative Example 2

The experimental procedure was substantially the same as in Example 1 except that the first and the second vinyl-containing organopolysiloxanes were replaced with 100 parts of a third vinyl-containing organopolysiloxanes having a viscosity of 800 centipoise and expressed by the structural formula

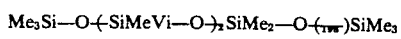
Me$_3$Si—O—(SiMeVi—O)$_n$SiMe$_2$—O—(SiMe$_2$—O)$_m$SiMe$_3$ and the organohydrogenpolysiloxane was replaced with 5.36 parts of a second organohydrogenpolysiloxane having a viscosity of 18 centipoise and expressed by the structural formula

H—SiMe$_2$—O—(SiMe$_2$—O)$_w$—SiMe$_2$—H.

The molar ratio of the silicon-bonded hydrogen atoms in the organohydrogenpolysiloxane to the silicon-bonded vinyl groups in the vinyl-containing organopolysiloxane was 0.5.

The value obtained in the penetration test was 65 and the weight decrease in the extraction test was 22% by weight.

Comparative Example 3

The experimental procedure was substantially the same as in Example 1 except that the first and the second vinyl-containing organopolysiloxanes were replaced with 100 parts of a fourth vinyl-containing organopolysiloxanes having a viscosity of 800 centipoise and expressed by the structural formula

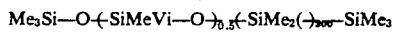
Me$_3$Si—O—(SiMeVi—O)$_{0.9}$(SiMe$_2$)$_{200}$—SiMe$_3$ and the amount of the organohydrogenpolysiloxane was decreased to 0.58 part. The molar ratio of the silicon-bonded hydrogen atoms in the organohydrogenpolysiloxane to the silicon-bonded vinyl groups in the vinyl-containing organopolysiloxane was 1.0.

The value obtained in the penetration test was 86 and the weight decrease in the extraction test was 40% by weight.

Comparative Example 4

The experimental procedure was substantially the same as in Example 1 except that the first and the second vinyl-containing organopolysiloxanes were replaced with 100 parts of a fifth vinyl-containing organopolysiloxanes having a viscosity of 800 centipoise and expressed by the structural formula

(Vi—SiMe$_2$—O)$_{0.9}$(SiMe$_2$—O)$_{200}$—(SiMe$_3$)$_{1.1}$ and the amount of the organohydrogenpolysiloxane was decreased to 1.06 parts. The molar ratio of the silicon-bonded hydrogen atoms in the organohydrogenpolysiloxane to the silicon-bonded vinyl groups in the vinyl-containing organopolysiloxane was 1.0.

The value obtained in the penetration test was 63 and the weight decrease in the extraction test was 35% by weight.

Example 3

A curable organopolysiloxane composition was prepared by uniformly blending 55 parts and 45 parts of the first and the second vinyl-containing organopolysiloxanes, respectively, as used in Example 1, 100 parts of a first dimethylpolysiloxane having a viscosity of 30 centipoise and expressed by the structural formula

$Me_3Si\text{—}O\text{—}SiMe_2\text{—}O_{20}SiMe_3$, 1.60 parts of the same organohydrogenpolysiloxane as used in Example 1 and 0.025 part of the same catalyst solution as used in Example 1. The molar ratio of the silicon-bonded hydrogen atoms in the organohydrogenpolysiloxane to the silicon-bonded vinyl groups in the vinyl-containing organopolysiloxane was 1.0.

The value obtained in the penetration test was 53. Further, the composition was spread in a sheet-like form of 140 mm by 170 mm by 2 mm dimensions weighing about 35 g and cured in the same heating schedule as in Example 1 to give a sheet of the gel-like material which was hung at room temperature for 2 months to determine the decrease in the weight due to bleeding of the oily material contained therein. The value obtained in this bleeding test was 0.5% by weight.

EXAMPLE 4

The experimental procedure was substantially the same as in Example 3 except that the first dimethylpolysiloxane was replaced with the same amount of a second dimethylpoly-siloxane having a viscosity of 100 centipoise and expressed by the structural formula

$Me_3Si\text{—}O\text{—}SiMe_2\text{—}SiMe_3$.

The molar ratio of the silicon-bonded hydrogen atoms in the organohydrogenpolysiloxane to the silicon-bonded vinyl groups in the vinyl containing organopolysiloxane was 1.0.

The value obtained in the penetration test was 53 and the weight loss in the bleeding test was 0.8% by weight.

EXAMPLE 5

The experimental procedure was substantially the same as in Example 3 except that the first dimethylpolysiloxane was replaced with the same amount of a third dimethylpoly-siloxane having a viscosity of 5000 centipoise and expressed by the structural formula

$Me_3Si\text{—}O\text{—}SiMe_2O_{450}SiMe_3$.

The molar ratio of the silicon-bonded hydrogen atoms in the organohydrogenpolysiloxane to the silicon-bonded vinyl groups in the vinyl-containing organopolysiloxane was 1.0

The value obtained in the penetration test was 56 and the weight loss in the bleeding test was 15% by weight.

EXAMPLE 6

The experimental procedure was substantially the same as in Example 3 except that the first dimethylpolysiloxane was replaced with the same amount of a fourth dimethylpoly-siloxane having a viscosity of 10000 centipoise and expressed by the structural formula

$Me_3Si\text{—}O\text{—}SiMe_2\text{—}O\text{—}SiMe_3$.

The molar ratio of the silicon-bonded hydrogen atoms in the organohydrogenpolysiloxane to the silicon-bonded vinyl groups in the vinyl-containing organopolysiloxane was 1.0.

The value obtained in the penetration test was 60 and the weight loss in the bleeding test was 10% by weight.

Comparative Example 5

The experimental procedure was substantially the same as in Example 3 except that the first and the second vinyl-containing organopolysiloxanes were replaced with 100 parts of a sixth vinyl-containing organopolysiloxane having a viscosity of 800 centipoise and expressed by the formula

$(Vi\text{—}SiMe_2\text{—}O_{0.6}SiMe_2\text{—}OSiMe_3)_{1.4}$ with omission of the dimethylpolysiloxane and the amount of the organohydrogenpolysiloxane was decreased to 0.85 part. The molar ratio of the silicon-bonded hydrogen atoms in the organohydrogenpolysiloxane to the silicon-bonded vinyl groups in the vinyl-containing organopolysiloxane was 1.2.

The value obtained in the penetration test was 90 and the weight loss in the bleeding test was 8% by weight.

Comparative Example 6

The experimental procedure was substantially the same as in Example 3 excepting omission of the dimethyl polysiloxane.

The value obtained in the penetration test was 35 and the weight loss in the bleeding test was 0.3% by weight.

What is claimed is:

1. A curable organopolysiloxane composition which comprises, as a uniform blend:
   (A) a combination of two vinyl-containing organopolysiloxanes consisting of
      (A-1) from 1% to 99% by weight of a first vinyl-containing diorganopolysiloxane having a viscosity in the range from 300 to 100,000 centipoise at 25° C. and represented by the general formula

$Vi\text{—}SiR_2\text{—}O\text{—}(SiR_2\text{—}O)_p SiR_2\text{—}Vi$, in which Vi is a vinyl group, R is a substituted or unsubstituted monovalent hydrocarbon group free from aliphatic unsaturation having 1 to 10 carbon atoms and the subscript p is a positive integer, and
      (A-2) from 99% to 1% by weight of a second vinyl-containing diorganopolysiloxane having a viscosity in the range from 300 to 100,000 centipoise at 25° C. and represented by the general formula

$Vi\text{—}SiR_2\text{—}O\text{—}(SiR_2\text{—}O)_q SiR_2\text{—}Me$, in which Vi and R each have the same meaning as defined above, Me is a methyl group and the subscript q is a positive integer;
   (B) an organohydrogenpolysiloxane represented by the average unit formula

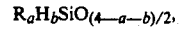

$R_a H_b SiO_{(4-a-b)/2}$, in which R has the same meaning as defined above, the subscript a is a positive number not exceeding 3 and the subscript b is a positive number not exceeding 2 with the proviso that a+b is smaller than 4, and having at least three hydrogen atoms directly bonded to the silicon atoms in a molecule in an amount sufficient to provide from 0.8 to 2.0 moles of the hydrogen atoms directly bonded to the silicon atoms per mole of the vinyl groups in the component (A); and (C) a catalytic amount of a compound of a metal selected from the group consisting of platinum, palladium and rhodium.

2. The curable organopolysiloxane composition as claimed in claim 1 which further comprises: (D) a vinyl-free organopolysiloxane having a viscosity not exceeding 200 centipoise at 25° C. and represented by the general formula

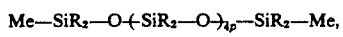

in which Me and R each have the same meaning as defined above and the subscript r is a positive integer, in an amount in the range from 5 to 200 parts by weight per 100 parts by weight of the component (A).

3. The curable organopolysiloxane composition as claimed in claim 1 wherein the component (A) is a combination of from 20% to 80% by weight of the first vinyl-containing organopolysiloxane and from 80% to 20% by weight of the second vinyl-containing organopolysiloxane.

4. The curable organopolysiloxane composition as claimed in claim 1 wherein the group denoted by R is a methyl group.

5. The curable organopolysiloxane composition as claimed in claim 1 wherein the first vinyl-containing organopoly-siloxane has a viscosity in the range from 500 to 10,000 centipoise at 25° C.

6. The curable organopolysiloxane composition as claimed in claim 1 wherein the second vinyl-containing organopoly-siloxane has a viscosity in the range from 500 to 10,000 centipoise at 25° C.

7. The curable organopolysiloxane composition as claimed in claim 1 wherein the component (C) is a platinum compound.

8. The curable organopolysiloxane composition as claimed in claim 7 wherein the amount of the platinum compound is in the range from 0.1 to 100 ppm by weight as platinum based on the total amount of the components (A) and (B).

* * * * *

UNITED STATES PATENT AND TRADEMARK OFFICE
CERTIFICATE OF CORRECTION

PATENT NO. : 4,990,560
DATED : February 5, 1991
INVENTOR(S) : Masayuki Ikeno and Hironao Fujiki It is certified that error appears in the above-identified patent and that said Letters Patent is hereby corrected as shown below:

Claim 2, column 11, line 17, "$Me-SiR_2-O-(-SiR_2-O-)_{4p}-SiR_2-Me$" should read --$Me-SiR_2-O-(-SiR_2-O-)_r-SiR_2-Me$--

Claim 5, column 12, line 3, "organopoly-siloxane" should read ---organopolysiloxane---

Claim 6, column 12, line 3, "organopoly-siloxane" should read ---organopolysiloxane---

Signed and Sealed this

Twentieth Day of April, 1993

Attest:

MICHAEL K. KIRK

Attesting Officer   Acting Commissioner of Patents and Trademarks